Oct. 15, 1929. R. E. BRIGGS 1,732,150
LIQUID LEVEL GAUGE
Filed July 22, 1924
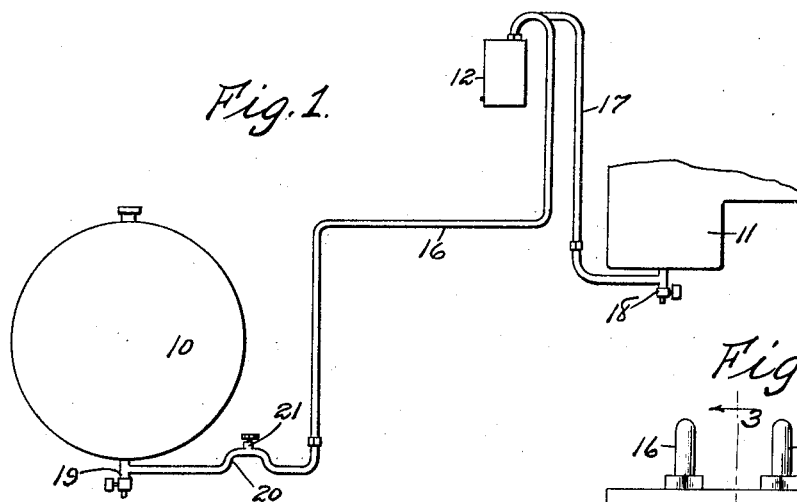
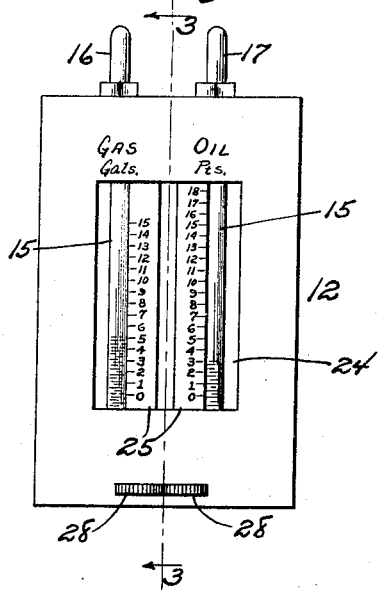
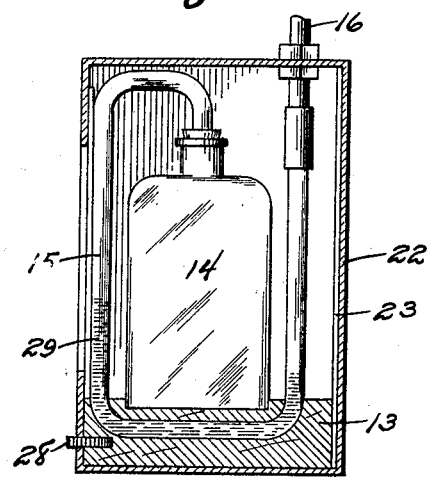
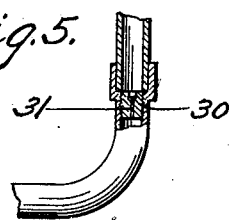
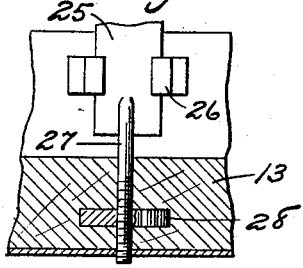
R. Ernest Briggs
INVENTOR
BY *Victor J. Evans*
ATTORNEY
WITNESS Patented Oct. 15, 1929

1,732,150

UNITED STATES PATENT OFFICE

ROBERT E. BRIGGS, OF CEDAREDGE, COLORADO

LIQUID LEVEL GAUGE

Application filed July 22, 1924. Serial No. 727,533.

This invention relates to indicating devices adapted to indicate at a remote point the amount of liquid within a container, the invention being especially adapted for use upon automobiles for the purpose of indicating the amount of gasoline within the fuel tank, or the amount of oil within the engine crank case, or both.

Another object of the invention is the provision of an indicating system and an indicator therefor, which is simple in construction, may be readily installed and which may be accurately adjusted for proper operation to accurately indicate the amount of oil and gasoline in their respective containers.

With the above and other objects in view, the invention further includes the following novel features and details of construction, to be hereinafter more fully described, illustrated in the accompanying drawings and pointed out in the appended claims.

In the drawings:—

Figure 1 is a diagrammatic view illustrating the invention.

Figure 2 is a face view of the indicator.

Figure 3 is a section taken substantially on the line 3—3 of Figure 2.

Figure 4 is an enlarged fragmentary sectional view illustrating the manner of adjusting the indicator dials.

Figure 5 is a fragmentary view partly in section illustrating the means for stabilizing the liquid in the indicator tubes.

Referring to the drawings in detail wherein like characters of reference denote corresponding parts, the reference character 10 indicates a container such as the fuel tank of an automobile, the crank case or oil reservoir of the engine being indicated at 11.

The indicator is designated generally at 12 and includes a block 13 within which is secured the containers 14 which are adapted to contain air. One of these containers is shown in Figure 3 of the drawings, there being one for the tank 10 and one for the reservoir 11. Extending from each of the containers 14 is a pipe which includes a transparent sight tube 15, one of which is connected by means of a tube 16 to the tank 10 and the other by means of a tube 17 to the reservoir 11. The connection with the reservoir is at the lowermost point of the latter and may be through the drain cock 18. The pipe 16 may also be connected to the tank 10 through a drain cock 19.

Included in the pipe 16 is an offset portion 20 which carries an air valve 21. This valve is adjusted when the tank is empty so that air pressure within the pipe 16 may be regulated.

The block within which the containers 14 and tubes 15 are carried is positioned within a casing 22. This casing is provided with an asbestos lining 23 so that the indicator will not be subject to sudden changes of temperature. The casing is provided with a sight opening 24 and movable within the casing and visible through the opening 24 are scale plates 25. One of these plates is provided for each of the transparent sight tubes 15 and is movable vertically in guides 26 secured within the casing 22. The plates are graduated as shown in Figure 2, one of said plates being graduated to indicate gallons for the gasoline indicator and the other graduated in pints for the oil reservoir indicator. Extending from each of the plates is a stem 27 which passes through the block 13 and is threaded for engagement with the threaded bore of a knurled nut 28, the latter operating in an opening provided in the block 13 and extending through the front of the casing 22. By operating the nuts 28, the plates may be adjusted.

Each of the sight tubes is adapted to contain a quanity of liquid such as alcohol indicated at 29 and as the pipe lines 16 and 17 are air-tight, when oil or gasoline is placed within the reservoir 11 and tank 10, air pressure within the pipes 16 and 17 will cause the liquid 29 within the sight tubes to raise, the amount being indicated on the plates 25. As the gasoline or oil is consumed the liquid will be correspondingly lowered as will be readily understood.

In order to prevent undue movement of the liquid 28 occasioned by jolting and consequent movement of the contents of the tank 10 and reservoir 11, the pipes 16 and 17 have secured therein a stabilizing element. This element is in the form of a plug 30 which is secured within each of the pipes 16 and 17 in any suitable manner, such as being threaded in the pipe. Each of the plugs is provided with a central bore or opening 31 which extends therethrough and which permits of the passage of either liquid or air but prevents sudden passage of the same therethrough.

When the tank 10 is empty, the valve 21 is closed. Introduction of liquid within the tank will, after the valve 21 is opened, cause the head of liquid within said tank to exert a pressure upon the column of air in the pipe 16 and thus affect the liquid column 29, so that the latter will move upward or downward within the sight tube in accordance with the pressure provided by the head of liquid within the tank. The containers 14 provide air pressure chambers at the other ends of the tubes and serve to act upon the adjacent ends of the liquid columns 29.

It will be apparent from the foregoing description and accompanying drawings that the invention provides a gauge for the purpose specified which operates without the use of springs or cables which frequently get out of adjustment. Different types of gasoline tanks require different gauge tubes and different size air pressure chambers while the oil gauge provides a straight tube for all types.

The invention is susceptible of various changes in its form, proportions and minor details of construction and the right is herein reserved to make such changes as properly fall within the scope of the appended claim.

Having described the invention what is claimed is:—

A liquid level indicating gauge comprising a housing having a sight opening therein, a vertically disposed substantially U-shaped tube adapted to have one end connected with a liquid container to provide pressure within the tube, an indicating liquid within the tube to be acted upon by said pressure, a container located within the casing and connected with the other end of the tube to provide an air pressure chamber, an indicator plate slidingly mounted within the casing adjacent the tube and visible through the sight opening, a threaded rod extending from one end of the plate, a rotatable disk threadedly engaging the rod, and means to hold the disk against axial movement to permit of adjustment of said plate.

In testimony whereof I affix my signature.

ROBERT E. BRIGGS.